(12) United States Patent
Smedberg et al.

(10) Patent No.: US 10,721,331 B2
(45) Date of Patent: Jul. 21, 2020

(54) USING AN INTEGRATION SERVICE TO FACILITATE INTERACTIONS BETWEEN SOFTWARE SYSTEMS

(71) Applicant: Zendesk, Inc., San Francisco, CA (US)

(72) Inventors: Michael Erik Smedberg, Oakland, CA (US); Ashwin Hegde, San Francisco, CA (US); Louis J. Chan, Belmont, CA (US); Jared W. Shay, San Francisco, CA (US); Henry Hsu, Fremont, CA (US)

(73) Assignee: Zendesk, Inc., San Francisco, CA (US)

( * ) Notice: Subject to any disclaimer, the term of this patent is extended or adjusted under 35 U.S.C. 154(b) by 150 days.

(21) Appl. No.: 15/154,638

(22) Filed: May 13, 2016

(65) Prior Publication Data
US 2017/0331923 A1 Nov. 16, 2017

(51) Int. Cl.
*H04L 29/08* (2006.01)

(52) U.S. Cl.
CPC .............. *H04L 67/34* (2013.01); *H04L 67/20* (2013.01); *H04L 67/26* (2013.01); *H04L 67/2838* (2013.01); *H04L 67/32* (2013.01)

(58) Field of Classification Search
CPC ......... H04L 67/34; H04L 67/26; H04L 67/32; G06F 3/04842
See application file for complete search history.

(56) References Cited

U.S. PATENT DOCUMENTS

| | | | | |
|---|---|---|---|---|
| 5,218,697 A | * | 6/1993 | Chung | G06F 16/258 709/230 |
| 8,639,582 B1 | * | 1/2014 | Sirota | G06Q 30/06 705/26.1 |
| 8,769,059 B1 | * | 7/2014 | Chheda | H04L 41/0866 705/26.5 |
| 9,246,690 B1 | * | 1/2016 | Roth | H04L 9/3268 |
| 2003/0078934 A1 | * | 4/2003 | Cappellucci | G09B 5/06 |
| 2004/0181576 A1 | * | 9/2004 | Lin | H04L 29/06 709/203 |
| 2005/0165902 A1 | * | 7/2005 | Hellenthal | H04L 29/06 709/217 |
| 2006/0059253 A1 | * | 3/2006 | Goodman | G06Q 10/10 709/223 |
| 2007/0201655 A1 | * | 8/2007 | Shenfield | G06F 8/61 379/201.01 |
| 2011/0022187 A1 | * | 1/2011 | Felts | G05B 19/4186 700/9 |

(Continued)

*Primary Examiner* — Uzma Alam
(74) *Attorney, Agent, or Firm* — Park, Vaughan, Fleming & Dowler LLP

(57) ABSTRACT

The disclosed embodiments provide a system that uses an integration service to facilitate access to an origin service. During operation, the integration service receives a request service from a software platform, wherein the request is made through an integration service application programming interface (API) provided by the integration service. In response to the request, the integration service makes a corresponding request to the origin service, wherein the corresponding request is made through an origin service API provided by the origin service, and wherein making the corresponding request involves translating data received through the integration service API into a format suitable for the origin service API.

27 Claims, 8 Drawing Sheets

(56) References Cited

U.S. PATENT DOCUMENTS

| | | | |
|---|---|---|---|
| 2011/0231899 A1* | 9/2011 | Pulier | G06F 9/45558 726/1 |
| 2011/0264567 A1* | 10/2011 | Clyne | G06Q 20/10 705/30 |
| 2012/0023545 A1* | 1/2012 | Qu | H04L 45/04 726/1 |
| 2012/0072925 A1* | 3/2012 | Jenkins | G06F 9/54 719/328 |
| 2012/0226987 A1* | 9/2012 | Wie | H04L 41/22 715/736 |
| 2012/0254357 A1* | 10/2012 | Kawakami | H04N 21/234309 709/217 |
| 2013/0066771 A1* | 3/2013 | Ciurea | G06Q 30/0201 705/39 |
| 2013/0086258 A1* | 4/2013 | Kalgi | H04L 63/1408 709/224 |
| 2013/0219415 A1* | 8/2013 | Jeon | G06F 9/541 719/328 |
| 2014/0140213 A1* | 5/2014 | Raleigh | H04L 43/0888 370/235 |
| 2014/0280961 A1* | 9/2014 | Martinez | H04L 41/5054 709/226 |
| 2015/0002614 A1* | 1/2015 | Zino | H04N 7/148 348/14.08 |
| 2015/0006694 A1* | 1/2015 | Garbi | H04L 41/06 709/223 |
| 2015/0119033 A1* | 4/2015 | Maria | H04W 48/18 455/435.2 |
| 2015/0134827 A1* | 5/2015 | Shah | G06F 9/455 709/226 |
| 2015/0142871 A1* | 5/2015 | Tofighbakhsh | H04W 4/60 709/203 |
| 2016/0342645 A1* | 11/2016 | Tempero | G06F 16/258 |

* cited by examiner

USING AN INTEGRATION SERVICE TO FACILITATE INTERACTIONS BETWEEN SOFTWARE SYSTEMS

BACKGROUND

Field

The disclosed embodiments generally relate to techniques for facilitating interactions between software systems. More specifically, the disclosed embodiments relate to the design of an integration service that facilitates interactions between a software system and one or more services provided by external software systems.

Related Art

As the Internet continues to evolve, software developers frequently encounter situations where a software platform needs to make calls to services provided by external software systems. For example, a developer of a customer-service platform, such as Zendesk, Inc., may want to enable customer-service agents to communicate with users through a messaging application, such as WeChat™, or to interact with posts to a social-networking application, such as Facebook™. However, the process of creating such integrations between software systems can be extremely time-consuming for developers because a large amount of code typically needs to be written to translate communications from the software platform into a format suitable for the application programming interfaces (APIs) provided by the external software systems.

Developers associated with the software platform often lack the time and resources to implement all of the integrations that might be desired by users of the software platform. However, this problem can potentially be alleviated by providing third-party developers with the necessary tools and resources to perform such integrations.

Hence, what is needed is a method and an apparatus for enabling third-party developers to perform integrations between a software system and services provided by external software systems.

SUMMARY

The disclosed embodiments provide a system that uses an integration service to facilitate access to an origin service. During operation, the integration service receives a request from a software platform, wherein the request is made through an integration service application programming interface (API) provided by the integration service. In response to the request, the integration service makes a corresponding request to the origin service, wherein the corresponding request is made through an origin service API provided by the origin service, and wherein making the corresponding request involves translating data received through the integration service API into a format suitable for the origin service API.

In some embodiments, upon receiving a response to the corresponding request from the origin service, the integration service makes a corresponding response to the software platform.

In some embodiments, during a pull operation, the request comprises a request for new content, and the response includes zero or more instances of new content provided by the origin service.

In some embodiments, during a push operation, the integration service calls an API on the software platform to push new content received from the origin service to the software platform.

In some embodiments, when the software platform receives a content item sent from the origin service through the integration service, along with an identifier for the content item, the software platform: (1) displays the content item to a user; (2) receives a response to the content item from the user; and (3) sends the response, along with the identifier for the content item, back to the origin service through the integration service, wherein the identifier enables the integration service to correlate the response with the content item.

In some embodiments, when the software platform makes a request that sends new content to the origin service through the integration service, the software platform stops listening for additional content until the software platform receives an identifier for the new content from the integration service, or until the request that sent the new content fails.

In some embodiments, the integration service is stateless, and as a consequence does not maintain state information that can be used to handle requests and responses.

In some embodiments, while configuring an integration service instance (ISI), when a user opens a web page in a web browser, the web browser requests an editor page from the software platform. The software platform responds to the web browser with a page that posts initial configuration data, which may be empty, to the integration service. After receiving the initial configuration data, the integration service provides a user interface (UI) based on the initial configuration data to the software platform. This allows the software platform to present the UI to the user through the web browser. Next, the integration service receives configuration data provided by the user through the UI. After receiving the configuration data, the integration service reformats and sends the configuration data to the software platform, so that the software platform can store the configuration data to facilitate subsequent operations involving the ISI.

In some embodiments, the software platform maintains an account for each organization that uses the software platform. Note that each of these accounts is associated with one or more registered integration services (RISs), wherein each RIS is associated with an integration service. Moreover, each RIS is associated with one or more integration service instances (ISIs), wherein each ISI can be associated with a user/account.

In some embodiments, the software platform comprises a help desk ticketing system. In a variation on this embodiment, the request received by the integration service is associated with a ticket related to a customer issue in the help desk ticketing system.

In some embodiments, the integration service is created by a third party, who may or may not be associated with an author of the origin service, and who may or may not be associated with an author of the software platform.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
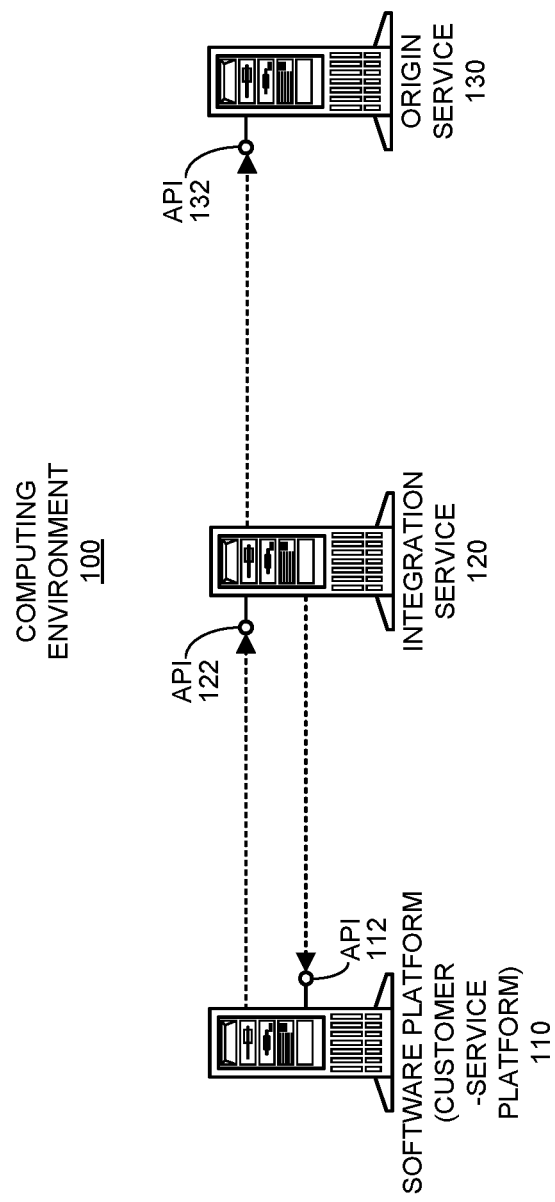
FIG. 1 illustrates a computing environment including a customer-service platform, an integration service and an origin service in accordance with the disclosed embodiments.

FIG. 1 illustrates a computing environment 100 including a software platform 110, an integration service 120 and an origin service 130 in accordance with the disclosed embodiments. Origin service 130 includes any type of computer-based system or application that provides a service that can be accessed by third-party systems. Software platform 110 can generally include any type of computer-based system that performs operations involving interacting with origin service 130. For example, software platform 110 can comprise a customer-service platform, such as the one offered by Zendesk, Inc., that facilitates interactions with customers to resolve issues associated with a product or a service. (The structure of an exemplary customer-service platform is described below with reference to FIG. 2.)

To facilitate interactions between software platform 110 and origin service 130, computing environment 100 includes an integration service 120, which comprises a software system that provides a "service" that operates in accordance with a client-server paradigm for distributed computing. Note that by structuring the software that facilitates interactions between software platform 110 and origin service 130 as a standalone service, it is possible for a third-party developer to create the service, wherein the third-party developer may or may not be affiliated with software platform 110, and may or may not be affiliated with origin service 130.

A number of application programming interfaces (APIs) are illustrated in FIG. 1. Software platform 110 can make calls to integration service 120 through an API 122 to perform operations that involve interactions with origin service 130. Integration service 120 can make calls to origin service 130 through an API 132. Note that API 132 is likely to be a publicly accessible API, which is unlikely to change to accommodate the requirements of software platform 110 or integration service 120. Integration service 120 can make calls to software platform 110 through an API 112, which, for example, can be used to perform a "push operation" as is described in more detail below. Note that integration service 120 can possibly provide an API that can be accessed by origin service 130. However, this type of API is less likely to be used, because origin service 130 would have to be modified to make calls to this API, and it is unlikely that the developers of origin service 130 would be willing to make such modifications. Note that origin service 130 can possibly offer the ability to push data back to integration services 120. For example, integration service 120 might register a callback URL, and origin service 130 might ping this callback URL when new data is available in the origin service. In general, communication between integration service 120 and origin service 130 may be via any expedient technique, including a pull-based approach, a streaming approach, a push-based approach, and any combination thereof.

Customer-Service Platform

Figure 2:
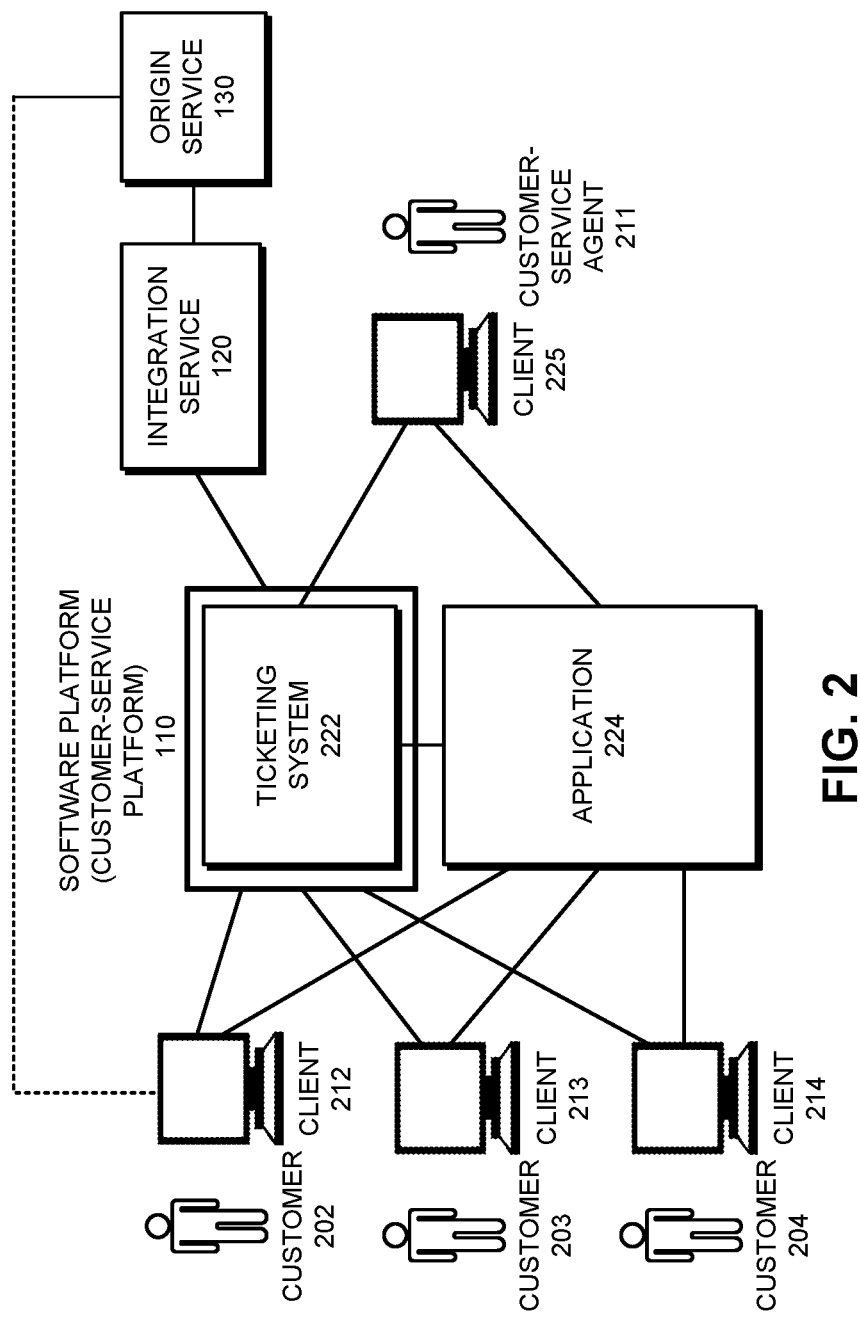
FIG. 2 illustrates a customer-service platform including a ticketing system and an associated application that interacts with the origin service through the integration service in accordance with the disclosed embodiments.

We now describe an exemplary implementation of software platform 110 that comprises a customer-service platform. In particular, FIG. 2 illustrates a customer-service platform 110, including an application 224 and a ticketing system 222, in accordance with the disclosed embodiments. Within customer-service platform 110, a number of customers 202-204 interact with application 224 through clients 212-214, respectively. Application 224 is provided by an organization, such as a commercial enterprise, to enable customers 202-204 to perform various operations associated with the organization, or to access one or more services provided by the organization. For example, application 224 can include online accounting software that customers 202-

204 can access to prepare and file tax returns online. In another example, application 224 provides a commercial website for selling sporting equipment. Note that application 224 can be hosted on a local or remote server.

If customers 202-204 have problems or questions about application 224, they can access a customer-service platform 110, which implements a "help desk" to obtain help in dealing with issues, which can include various problems and questions. For example, a user of accounting software may need help in using a feature of the accounting software, or a customer of a website that sells sporting equipment may need help in cancelling an order that was erroneously entered. This help may be provided by a customer-service agent 211 who operates a client 225 and interacts with customers 202-204 through customer-service platform 110. Note that customer-service agent 211 can access application 224 (either directly or indirectly through customer-service platform 110) to help resolve an issue. Note that during operation, ticketing system 222 can interact with origin service 130 through integration service 120. For example, origin service 130 might be a social-networking site, such as Facebook™ and such interactions can enable a user of the social-networking site to communicate with ticketing systems 222 about issues related to application 224. (See dashed in line FIG. 2.)

Customer-service platform 110 organizes customer issues using a ticketing system 222, which generates tickets to represent each customer issue. Ticketing systems are typically associated with a physical or virtual "help desk" for resolving customer problems. Note that, although the present invention is described with reference to a ticketing system, it is not meant to be limited to customer-service interactions involving ticketing systems.

Ticketing system 222 comprises a set of software resources that enable a customer to resolve an issue. In the illustrated embodiment, specific customer issues are associated with abstractions called "tickets," which encapsulate various data and metadata associated with the customer requests to resolve an issue. (Within this specification, tickets are more generally referred to as "customer requests.") An exemplary ticket can include a ticket identifier, and information (or links to information) associated with the problem. For example, this information can include: (1) information about the problem; (2) customer information for one or more customers who are affected by the problem; (3) agent information for one or more customer-service agents who are interacting with the customer; (4) email and other electronic communications about the problem (which, for example, can include a question posed by a customer about the problem); (5) information about telephone calls associated with the problem; (6) timeline information associated with customer-service interactions to resolve the problem, including response times and resolution times, such as a first reply time, a time to full resolution and a requester wait time; and (7) effort metrics, such as: number of communications or responses by a customer, number of times a ticket has been reopened, and number of times the ticket has been reassigned to a different customer-service agent.

Processing a Request

Figure 3:
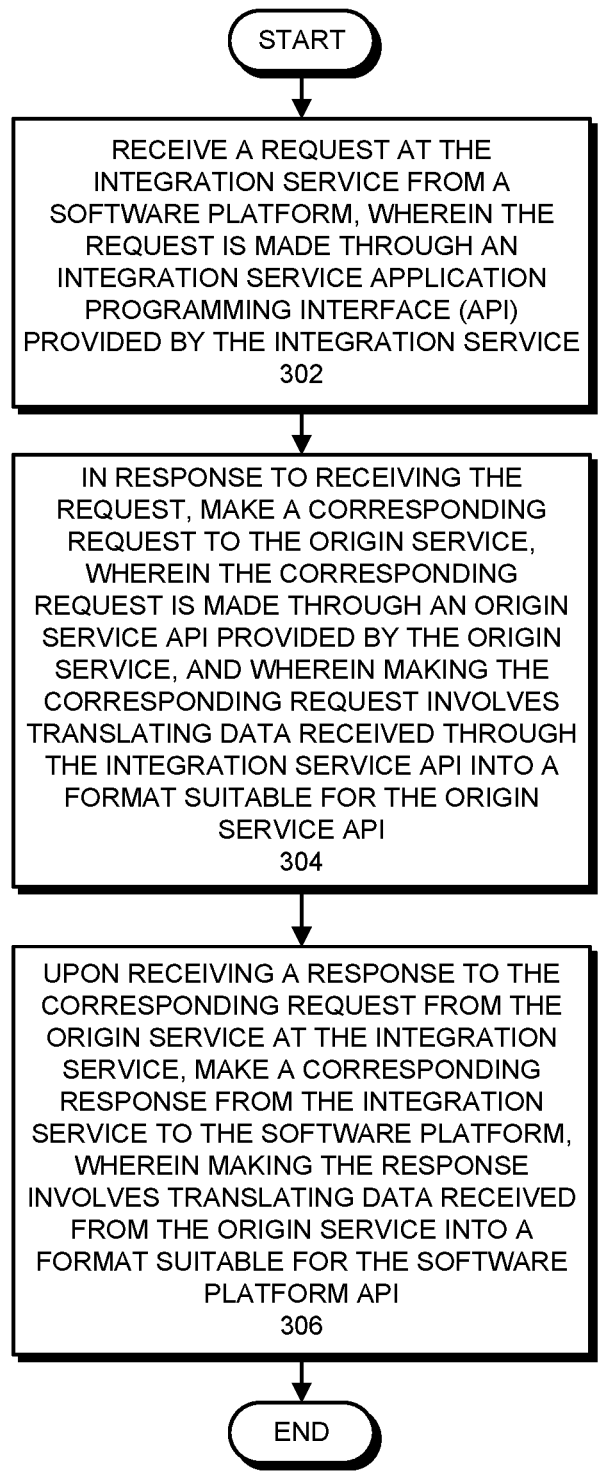
FIG. 3 presents a flow chart illustrating how an integration service processes a request from a software platform in accordance with the disclosed embodiments.

FIG. 3 presents a flow chart illustrating how a system that includes an integration service processes a request from a software platform in accordance with the disclosed embodiments. During operation, the system receives a request at the integration service from a software platform, wherein the request is made through an integration service API provided by the integration service (step 302). In response to receiving the request, the integration service makes a corresponding request to the origin service, wherein the corresponding request is made through an origin service API provided by the origin service, and wherein making the corresponding request involves translating data received through the integration service API into a format suitable for the origin service API (step 304). Next, upon receiving a response to the corresponding request from the origin service at the integration service, the integration service makes a corresponding response to the software platform, wherein making the corresponding response involves translating data received from the origin service into a format suitable for the software platform (step 306).

Pull Operation

Figure 4:
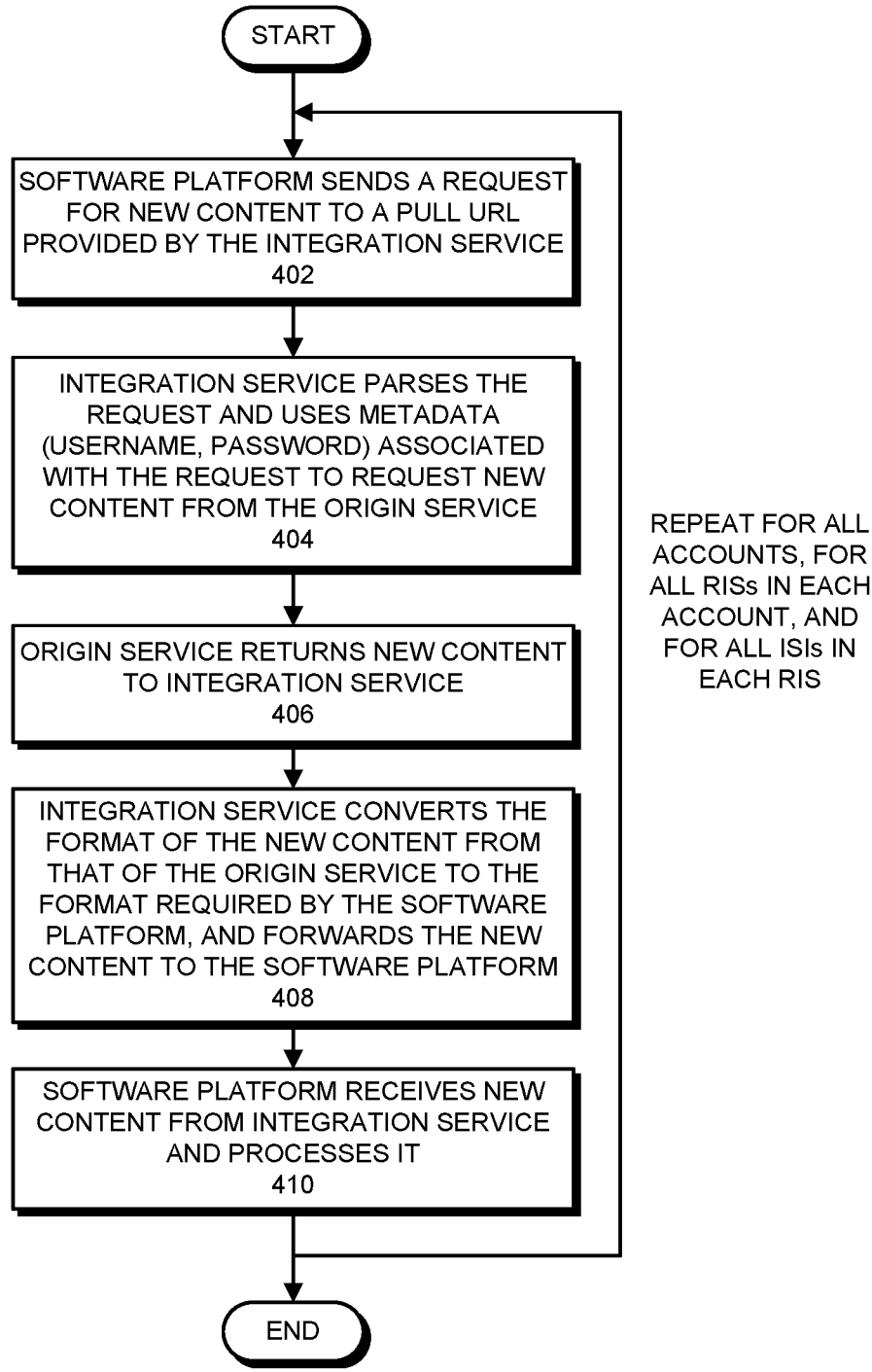
FIG. 4 presents a flow chart illustrating how the integration processes a request for a "pull" operation in accordance with the disclosed embodiments.

FIG. 4 presents a flow chart illustrating how a special type of request referred to as "pull operation" is processed in accordance with the disclosed embodiments, as opposed to processing a general request as is described above with reference to FIG. 3. The example in FIG. 4 assumes that the software platform maintains an account for each organization that uses the software platform, wherein each of these accounts is associated with one or more registered integration services (RISs), wherein each RIS is associated with an integration service. Moreover, each RIS is associated with one or more integration service instances (ISIs), wherein each ISI can be associated with a user/account. Note that once an administrator registers an RIS, the administrator may register multiple ISIs, wherein each ISI can be separately configured. Moreover, in this example, content items, such as comments, are associated with individual ISIs, rather than with services as a whole.

Referring to FIG. 4, during a pull operation, the software platform sends a request for new content to a "pull URL" that is provided by the integration service (step 402). This request can include parameters, such as a date-range for the new content and an identifier for a user associated with the new content. Moreover, the pull operation can be initiated by a cron daemon at periodic intervals, for example every two minutes. (Alternatively, the pull operation can be manually triggered.) Note that the software platform can also provide a separate "post URL" that the integration service can use to post new data to.

Next, the integration service parses the request and uses metadata (such as a "username" and a "password") associated with the request to ask for new content from the origin service (step 404). Then, the origin service returns new content (if it exists) to the integration service (step 406). Note that the integration service can alternatively indicate that there presently does not exist any new content to return. If new content exists, the integration service can optionally perform filtering and/or processing operations on the new content. For example, the integration service can filter out "garbage comments," such as comments that are less than 5 characters long, or comments which contain the words "buy now" (i.e., spam). Next, the integration service converts the format of the new content from that of the origin service to the format required by the software platform and forwards the new content to the software platform (step 408). Finally, the software platform receives the new content and processes it (step 410).

Push Operation

Figure 5A:
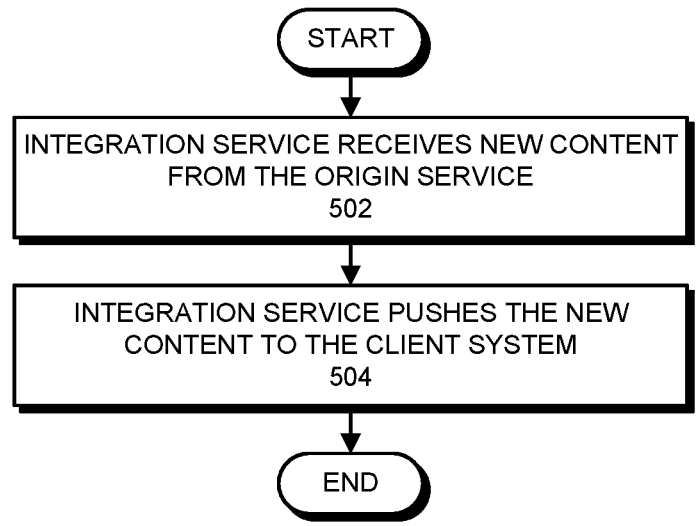
FIG. 5A presents a flow chart illustrating how new content is pushed to the software platform in accordance with the disclosed embodiments.

As an alternative to performing a "pull operation" to pull in new content from the origin server, the system can also provide a "push operation" that pushes new content for the origin server to the software platform. For example, FIG. 5A presents a flow chart illustrating how new content can be pushed to the software platform in accordance with the disclosed embodiments. First, the integration service receives new content from the origin service (step 502). Next, the integration service pushes the new content to the software platform (step 504).

Channel-Back Operation

In some cases, when the software platform receives a content item from the origin service, the software platform may want to send a response to the content item back to the origin service in a manner that enables the integration service to correlate the response with the content item. This can be accomplished by supporting a "channel-back operation," which returns to the integration service an identifier for the content item along with the response.

Figure 6:
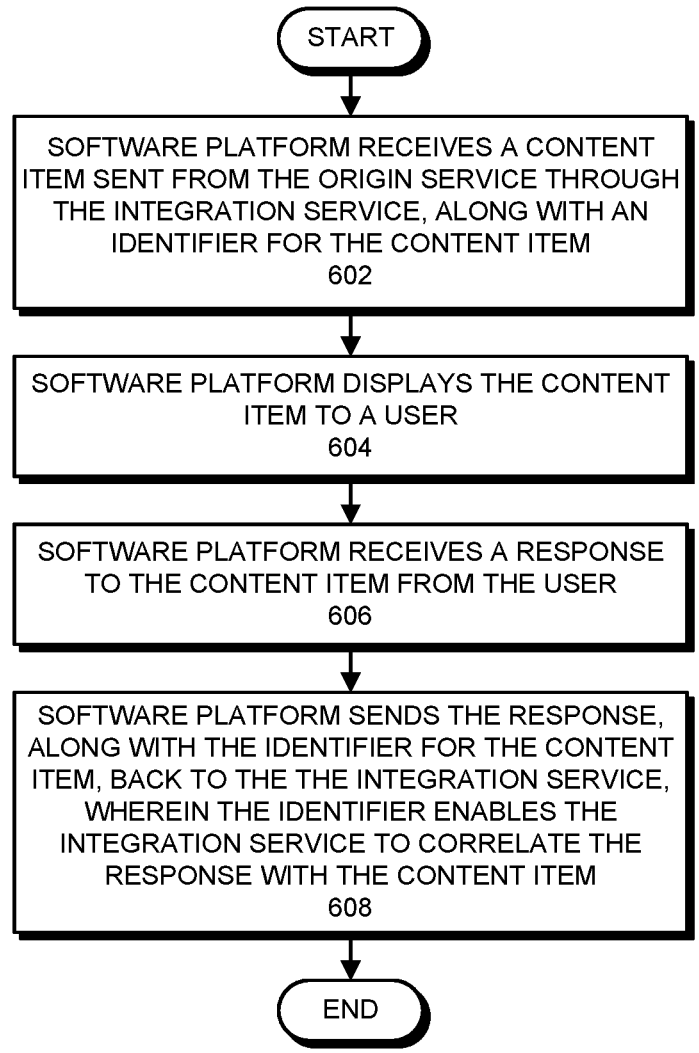
FIG. 6 presents a flow chart illustrating how the integration service supports a channel-back operation in accordance with the disclosed embodiments.

More specifically, FIG. 6 presents a flow chart illustrating how the integration service supports a channel-back operation in accordance with the disclosed embodiments. The process starts when the software platform receives a content item that was sent from the origin service through the integration service, along with an identifier for the content item (step 602). Next, the software platform displays the content item to a user (step 604). The software platform then receives a response to the content item from the user (step 606). Finally, the software platform sends the response, along with the identifier for the content item, back to the integration service, wherein the identifier enables the integration service to correlate the response with the content item (step 608).

Figure 7:
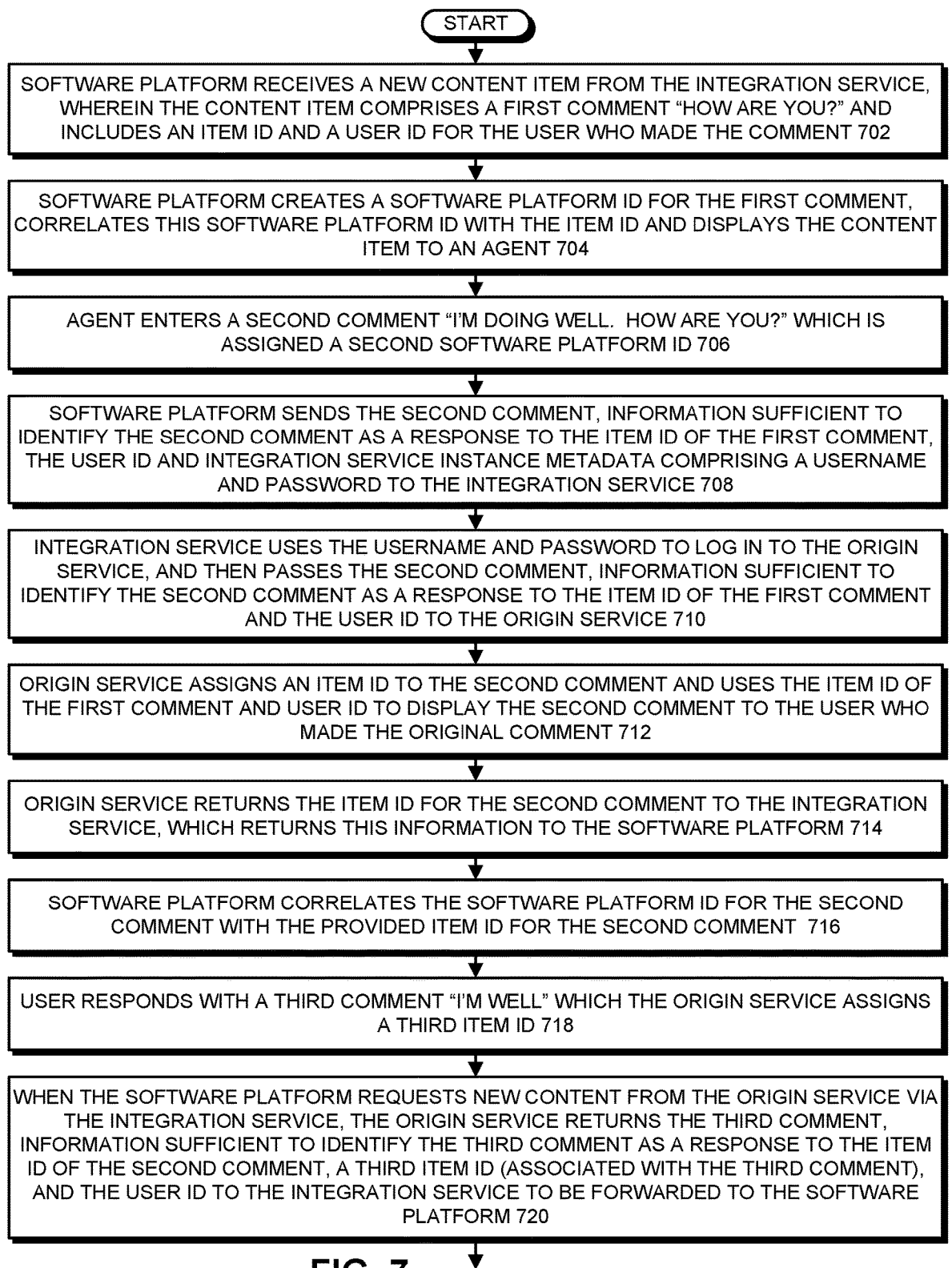
FIG. 7 presents a flow chart illustrating an example of a channel-back operation in accordance with the disclosed embodiments.

FIG. 7 presents a flow chart illustrating a more specific example of a channel-back operation in accordance with the disclosed embodiments. First, the software platform receives a new content item from the integration service, wherein the content item comprises a first comment "How are you?" and includes an item ID and a user ID for the user who made the comment (step 702). Next, the software platform creates a software platform ID for the first comment, correlates this software platform ID with the item ID and displays the content item to an agent (step 704). In response, the agent enters a second comment "I'm doing well. How are you?" which is assigned a second software platform ID (step 706). The software platform then sends the second comment, information sufficient to identify the second comment as a response to the item ID of the first comment, the user ID and integration service instance metadata comprising a username and password to the integration service (step 708). Next, the integration service uses the username and password to log in to the origin service, and then passes the second comment, information sufficient to identify the second comment as a response to the item ID of the first comment and the user ID to the origin service (step 710). The origin service then assigns an item ID to the second comment and uses the item ID of the first comment and user ID to display the second comment to the user who made the original comment (step 712). The origin service then returns the item ID for the second comment to the integration service, which returns this information to the software platform (step 714). Upon receiving this information, the software platform correlates the software platform ID for the second comment with the provided item ID for the second comment (step 716). The user then responds with a third comment "I'm well" which the origin service assigns a third item ID (step 718). Finally, when the software platform requests new content from the origin service via the integration service, the origin service returns the third comment, information sufficient to identify the third comment as a response to the item ID of the second comment, a third item ID (associated with the third comment), and the user ID to the integration service to be forwarded to the software platform (step 720).

Locking Operation

In some cases, the above-described system is susceptible to an error that causes a content item to be duplicated at the software platform. For example, suppose the software platform receives a new comment "how are you?" along with an item ID 456 from the origin server. Next, an agent at the software platform responds "I'm well," and the software platform sends this response to the integration service and specifies that the response is associated with item ID 456. Upon receiving this response, the integration service forwards the response to the origin server along with item ID 456, and the origin server instantiates a new content item for the response "I'm well" and associates this newly instantiated content item with item ID 789. The origin service then sends the software platform a confirmation telling the software platform a new content item has been created for the response "I'm well" with an item ID 789. However, this confirmation gets delayed by a slow network connection. In the meantime, the software platform performs a pull operation and receives the content item "I'm well" with the item ID 789. Because of the delayed confirmation, the software platform does not realize that it actually created the content item "I'm well," which was received through the pull operation. This causes the software platform to think it has received a new content item, and to record a duplicate of content item "I'm well" with the item ID 789.

Figure 5B:
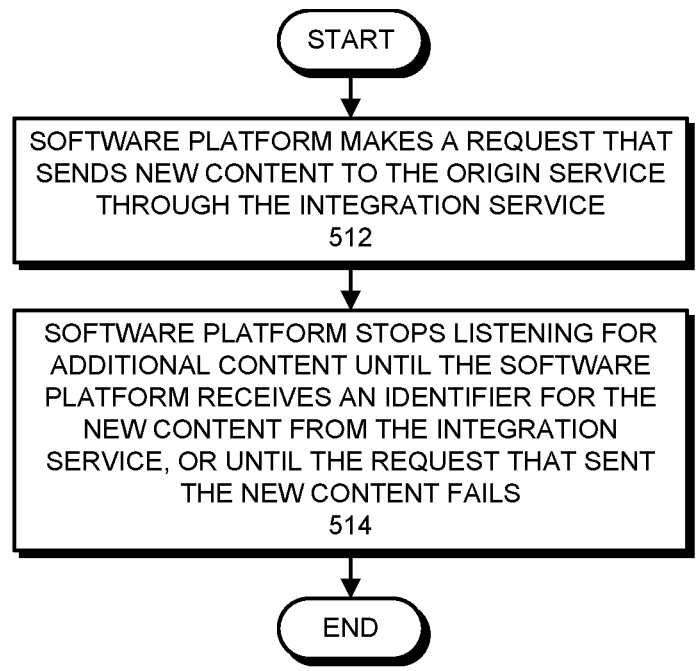
FIG. 5B presents a flow chart illustrating how the software platform performs a locking operation in accordance with the disclosed embodiments.

To prevent this type of duplication error, the system can perform a "locking operation," which prevents the software platform from listening for new content items until a confirmation is received for a content item that was previously sent to the origin service. More specifically, FIG. 5B presents a flow chart illustrating how the software platform performs a locking operation in accordance with the disclosed embodiments. In situations where the software platform makes a request that sends new content to the origin service through the integration service (step 512), the software platform stops listening for additional content until the software platform receives an identifier for the new content from the integration service, or until the request that sent the new content fails (for example, times out) (step 514).

Obtaining Configuration Information

In some embodiments, the integration service is "stateless," which means that it does not maintain any state information that can be used to facilitate communications between the software platform and the origin server. Instead, all of the items of information required to facilitate a request to the origin server (such as a username and a password) are stored at the software platform. This complicates matters because a third party who develops the integration service must somehow have a way to obtain this information and cause the information to be stored on the software platform. The integration service can do this by providing a user interface (UI) to the software platform, which the software platform presents to a user to obtain this information.

Figure 8:
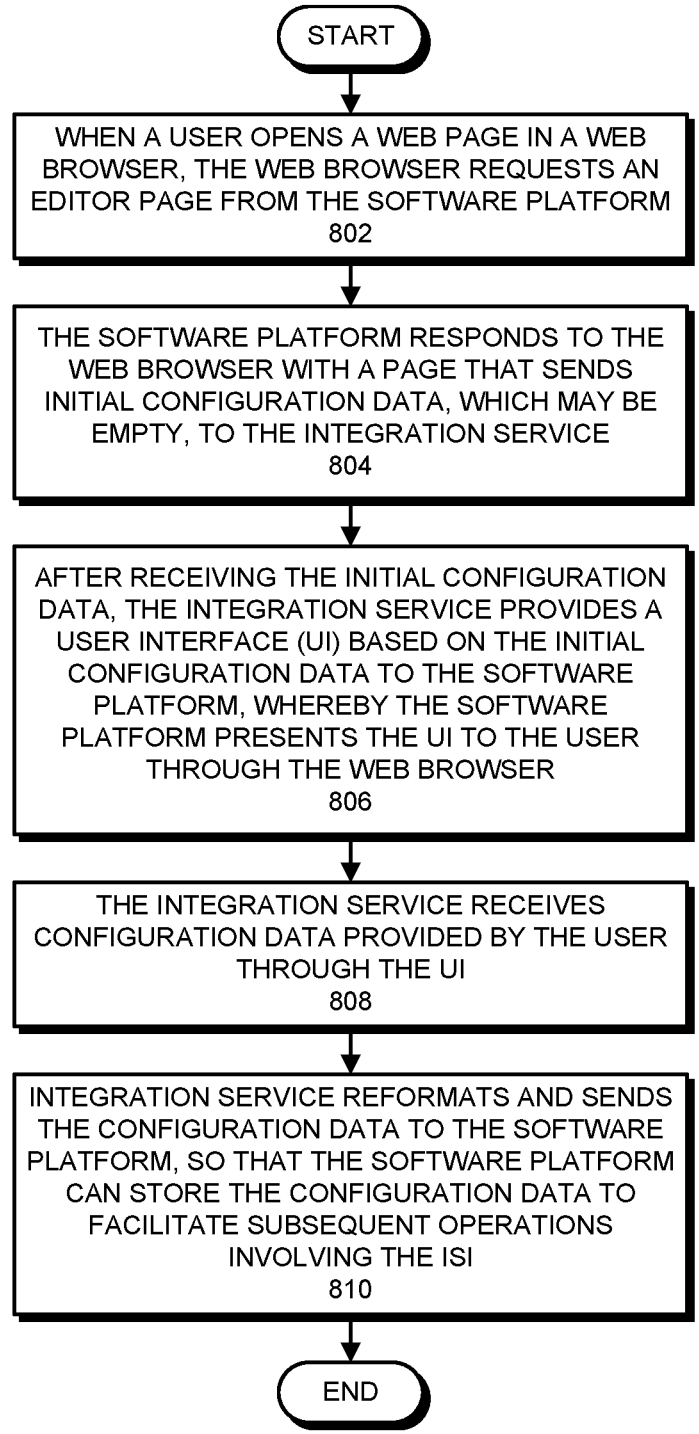
FIG. 8 presents a flow chart illustrating how the integration service obtains configuration information from a user in accordance with the disclosed embodiments.

More specifically, FIG. 8 presents a flow chart illustrating how the integration service obtains configuration information (e.g., a username and password) from a user in accordance with the disclosed embodiments. During the process of configuring an integration service instance (ISI), when a user opens a web page in a web browser, the web browser requests an editor page from the software platform (step 802). The software platform responds to the web browser with a page that sends initial configuration data, which may be empty, to the integration service (step 804). After receiving the initial configuration data, the integration service provides a user interface (UI) based on the initial configuration data to the software platform, whereby the software platform presents the UI to the user through the web browser (step 806). Note that while presenting the UI to the user, the software platform can provide a warning to the user indicating that the UI did not originate in the software platform, and the UI might be improperly requesting confidential data. Next, the integration service receives configuration data provided by the user through the UI (step 808). After receiving the configuration data, the integration service reformats and sends the configuration data to the software platform, so that the software platform can store the configuration data to facilitate subsequent operations involving the ISI (step 810). For example the integration service can reformat the configuration data as a string that is stored by the software platform on behalf of the ISI, whereby the software platform can include this string with any subsequent request made on behalf of the ISI.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for using an integration service to facilitate accesses to an origin service from a software platform, comprising:
   receiving a request at the integration service from the software platform,
      wherein the request is made through an integration service application programming interface (API) provided by the integration service;
   in response to receiving the request, the integration service making a corresponding request to the origin service,
      wherein the corresponding request is made through an origin service API provided by the origin service, and
      wherein making the corresponding request involves the integration service translating data received through the integration service API into a format suitable for the origin service API, wherein the integration service is a third party, wherein translating data only happens in the integration service, wherein the integration service is implemented on separate hardware from the origin service and the software platform, and wherein translating data comprises reformatting data and correlating data; and
   wherein the integration service is stateless, and consequently does not maintain state information that can be used to handle requests and responses, and wherein the integration service provides to a user a state information user interface (UI) to the software platform so that the software platform can gather state information directly from the user.

2. The method of claim 1, further comprising:
   receiving a response to the corresponding request from the origin service at the integration service; and
   upon receiving the response, the integration service making a corresponding response from the integration service to the software platform, wherein making the corresponding response involves the integration service translating data received from the origin service into a format suitable for the software platform.

3. The method of claim 1, wherein during a pull operation, the request comprises a request for new content, and the response includes new content provided by the origin service.

4. The method of claim 1, wherein during a push operation, the integration service calls an API on the software platform to push new content received from the origin service to the software platform.

5. The method of claim 1, wherein when the software platform receives a content item sent from the origin service through the integration service, along with an identifier for the content item, the software platform:
   displays the content item to a user;
   receives a response to the content item from the user; and
   sends the response, along with the identifier for the content item, back to the origin service through the integration service, wherein the identifier enables the integration service to correlate the response with the content item.

6. The method of claim 1, wherein when the software platform makes a request that sends new content to the origin service through the integration service, the software platform stops listening for additional content until the software platform receives an identifier for the new content from the integration service, or until the request that sent the new content fails.

7. The method of claim 1, wherein a process for configuring an integration service instance (ISI) operates as follows:
   in response a user opening a web page in a web browser, the web browser requests an editor page from the software platform;
   the software platform responds to the web browser with a page that sends initial configuration data to the integration service after receiving the initial configuration data, the integration service provides a user interface (UI) based on the initial configuration data to the software platform, whereby the software platform presents the UI to the user through the web browser;
   the integration service receives configuration data provided by the user through the UI; and
   after receiving the configuration data, the integration service reformats and sends the configuration data to the software platform, so that the software platform can store the configuration data to facilitate subsequent operations involving the ISI.

8. The method of claim 1,
   wherein the software platform maintains an account for each organization that uses the software platform;
   wherein each account is capable of being associated with one or more registered integration services (RISs), wherein each RIS is associated with an integration service; and
   wherein each RIS is associated with one or more integration service instances (ISIs), wherein each ISI can be associated with a user/account.

9. The method of claim 1, wherein the software platform comprises a help desk ticketing system.

10. The method of claim 9, wherein the request is associated with a ticket related to a customer issue in the help desk ticketing system.

11. The method of claim 1, wherein the third party may or may not be associated with an author of the origin service, and wherein the third party may or may not be associated with an author of the software platform.

12. A non-transitory computer-readable storage medium storing instructions that when executed by a computer cause the computer to perform a method for using an integration service to facilitate accesses to an origin service from a software platform, the method comprising:
   receiving a request at the integration service from the software platform,
      wherein the request is made through an integration service application programming interface (API) provided by the integration service;
   in response to receiving the request, the integration service making a corresponding request to the origin service,
      wherein the corresponding request is made through an origin service API provided by the origin service, and
      wherein making the corresponding request involves the integration service translating data received through the integration service API into a format suitable for the origin service API, wherein the integration service is a third party, wherein translating data only happens in the integration service, wherein the integration service is implemented on separate hardware from the origin service and the software platform, and wherein translating data comprises reformatting data and correlating data; and
   wherein the integration service is stateless, and consequently does not maintain state information that can be used to handle requests and responses, and wherein the integration service provides to a user a state information user interface (UI) to the software platform so that the software platform can gather state information directly from the user.

13. The non-transitory computer-readable storage medium of claim 12, further comprising:
   receiving a response to the corresponding request from the origin service at the integration service; and
   upon receiving the response, the integration service making a corresponding response from the integration service to the software platform, wherein making the corresponding response involves the integration service translating data received from the origin service into a format suitable for the software platform.

14. The non-transitory computer-readable storage medium of claim 12, wherein during a pull operation, the request comprises a request for new content, and the response includes new content provided by the origin service.

15. The non-transitory computer-readable storage medium of claim 12, wherein during a push operation, the integration service calls an API on the software platform to push new content received from the origin service to the software platform.

16. The non-transitory computer-readable storage medium of claim 12, wherein when the software platform receives a content item sent from the origin service through the integration service, along with an identifier for the content item, the software platform:
   displays the content item to a user;
   receives a response to the content item from the user; and
   sends the response, along with the identifier for the content item, back to the origin service through the integration service, wherein the identifier enables the integration service to correlate the response with the content item.

17. The non-transitory computer-readable storage medium of claim 12, wherein when the software platform makes a request that sends new content to the origin service through the integration service, the software platform stops listening for additional content until the software platform receives an identifier for the new content from the integration service, or until the request that sent the new content fails.

18. The non-transitory computer-readable storage medium of claim 12, wherein a process for configuring an integration service instance (ISI) operates as follows:
   in response a user opening a web page in a web browser, the web browser requests an editor page from the software platform;
   the software platform responds to the web browser with a page that sends initial configuration data to the integration service
   after receiving the initial configuration data, the integration service provides a user interface (UI) based on the initial configuration data to the software platform, whereby the software platform presents the UI to the user through the web browser;
   the integration service receives configuration data provided by the user through the UI; and
   after receiving the configuration data, the integration service reformats and sends the configuration data to the software platform, so that the software platform can store the configuration data to facilitate subsequent operations involving the ISI.

19. The non-transitory computer-readable storage medium of claim 12,
   wherein the software platform maintains an account for each organization that uses the software platform;
   wherein each account is capable of being associated with one or more registered integration services (RISs), wherein each RIS is associated with an integration service; and
   wherein each RIS is associated with one or more integration service instances (ISIs), wherein each ISI can be associated with a user/account.

20. A system that uses an integration service to facilitate accesses to an origin service from a software platform, comprising:
   at least one processor and at least one associated memory;
   an integration service that executes on at least one processor, wherein during operation, the integration service:
      receives a request from the software platform,
         wherein the request is made through an integration service application programming interface (API) provided by the integration service; and
      in response to receiving the request, makes a corresponding request to the origin service,
         wherein the corresponding request is made through an origin service API provided by the origin service, and
         wherein making the corresponding request involves translating data received through the integration service API into a format suitable for the origin service API, wherein the integration service is a third party, wherein translating data only happens in the integration service, wherein the integration service is implemented on separate hardware from the origin service and the software platform, and wherein translating data comprises reformatting data and correlating data; and wherein the integration service is stateless, and consequently does not maintain state information that can be used to handle requests and responses, and wherein the integration service provides to a user a state information user interface (UI) to the software platform so that the software platform can gather state information directly from the user.

21. The system of claim 20, further comprising:

receiving a response to the corresponding request from the origin service at the integration service; and upon receiving the response, making a corresponding response from the integration service to the software platform, wherein making the corresponding response involves translating data received from the origin service into a format suitable for the software platform.

22. The system of claim 20, wherein during a pull operation, the request comprises a request for new content, and the response includes new content provided by the origin service.

23. The system of claim 20, wherein during a push operation, the integration service calls an API on the software platform to push new content received from the origin service to the software platform.

24. The system of claim 20, wherein when the software platform receives a content item sent from the origin service through the integration service, along with an identifier for the content item, the software platform:

displays the content item to a user;

receives a response to the content item from the user; and sends the response, along with the identifier for the content item, back to the origin service through the integration service, wherein the identifier enables the integration service to correlate the response with the content item.

25. The system of claim 20, wherein when the software platform makes a request that sends new content to the origin service through the integration service, the software platform stops listening for additional content until the software platform receives an identifier for the new content from the integration service, or until the request that sent the new content fails.

26. The system of claim 20, wherein a process for configuring an integration service instance (ISI) operates as follows:

in response a user opening a web page in a web browser, the web browser requests an editor page from the software platform;

the software platform responds to the web browser with a page that sends initial configuration data to the integration service after receiving the initial configuration data, the integration service provides a user interface (UI) based on the initial configuration data to the software platform, whereby the software platform presents the UI to the user through the web browser;

the integration service receives configuration data provided by the user through the UI; and after receiving the configuration data, the integration service reformats and sends the configuration data to the software platform, so that the software platform can store the configuration data to facilitate subsequent operations involving the ISI.

27. The system of claim 20, wherein the software platform maintains an account for each organization that uses the software platform;

wherein each account is capable of being associated with one or more registered integration services (RISs), wherein each RIS is associated with an integration service; and wherein each RIS is associated with one or more integration service instances (ISIs), wherein each ISI can be associated with a user/account.

* * * * *